(12) United States Patent
Chigusa

(10) Patent No.: US 8,782,737 B2
(45) Date of Patent: Jul. 15, 2014

(54) IMAGE FORMING APPARATUS, IMAGE FORMING METHOD, AND AUTHENTICATION PROGRAM PRODUCT

(75) Inventor: Yoshinari Chigusa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 96 days.

(21) Appl. No.: 13/366,588

(22) Filed: Feb. 6, 2012

(65) Prior Publication Data

US 2012/0216250 A1 Aug. 23, 2012

(30) Foreign Application Priority Data

Feb. 21, 2011 (JP) ................. 2011-034679

(51) Int. Cl.
*G06F 21/00* (2013.01)
*G06F 21/34* (2013.01)
*G06F 21/83* (2013.01)
*G06F 21/74* (2013.01)
*G06F 21/60* (2013.01)

(52) U.S. Cl.
CPC ............ *G06F 21/34* (2013.01); *G06F 21/83* (2013.01); *G06F 21/74* (2013.01); *G06F 21/608* (2013.01)
USPC ............................................................ 726/2

(58) Field of Classification Search
CPC ......... G06F 21/34; G06F 21/83; G06F 21/74; G06F 21/608
USPC ............................................................ 726/2
See application file for complete search history.

(56) References Cited

U.S. PATENT DOCUMENTS 7,618,115 B2  11/2009  Chigusa
2007/0098428 A1*  5/2007  Furumoto .................... 399/81
2009/0158422 A1*  6/2009  Tomiyasu et al. ............. 726/17
2009/0300228 A1*  12/2009  Nakao .......................... 710/18
2009/0319443 A1*  12/2009  Nakajima et al. ............. 705/400

FOREIGN PATENT DOCUMENTS

| JP | 2005-335215 | 12/2005 |
| JP | 4093143 | 3/2008 |
| JP | 4311474 | 5/2009 |
| JP | 2009-171367 | 7/2009 |
| JP | 2009-292085 | 12/2009 |
| JP | 2010-21724 | 1/2010 |
| JP | 2010-136440 | 6/2010 |
| JP | 4557047 | 7/2010 |

* cited by examiner

*Primary Examiner* — Peter Shaw
(74) *Attorney, Agent, or Firm* — Oblon, Spivak, McClelland, Maier & Neustadt, L.L.P.

(57) ABSTRACT

An image forming apparatus provided with a document transport unit that transports a document placed thereon, a confirmation unit that confirms whether a detachable recording medium is connected and whether the document is placed, an authentication control unit that controls an authentication and, when the authentication is succeeded, switches an authentication status from a non-authenticated mode to an authenticated mode, and a function execution unit that executes a function, while the authentication status is the authenticated mode. The authentication control unit controls a switching of the authentication status from the authenticated mode to the non-authenticated mode, on the basis of a status indicating whether the recording medium is connected and a status indicating whether the document is placed during the non-authenticated mode, as well as a status indicating whether the recording medium is connected and a status indicating whether the document is placed during the authenticated mode.

17 Claims, 6 Drawing Sheets

| | STATE BEFORE LOGIN | | STATE AFTER LOGIN | | LOGOUT |
|---|---|---|---|---|---|
| | ADF DOCUMENT | USB MEMORY | ADF DOCUMENT | USB MEMORY | |
| FIRST CASE | ABSENT | ABSENT | PRESENT | ABSENT | DONE |
| SECOND CASE | ABSENT | ABSENT | ABSENT | PRESENT | DONE |
| THIRD CASE | PRESENT | ABSENT | ABSENT | ABSENT | DONE |
| FOURTH CASE | PRESENT | ABSENT | PRESENT | PRESENT | DONE |
| FIFTH CASE | ABSENT | PRESENT | PRESENT | PRESENT | NOT DONE |
| SIXTH CASE | ABSENT | PRESENT | PRESENT or ABSENT | ABSENT | DONE |
| SEVENTH CASE | PRESENT | PRESENT | ABSENT | PRESENT | NOT DONE |
| EIGHTH CASE | PRESENT | PRESENT | PRESENT or ABSENT | ABSENT | DONE |

FIG.2

|  | STATE BEFORE LOGIN | | STATE AFTER LOGIN | | LOGOUT |
|---|---|---|---|---|---|
|  | ADF DOCUMENT | USB MEMORY | ADF DOCUMENT | USB MEMORY | |
| FIRST CASE | ABSENT | ABSENT | PRESENT | ABSENT | DONE |
| SECOND CASE | ABSENT | ABSENT | ABSENT | PRESENT | DONE |
| THIRD CASE | PRESENT | ABSENT | ABSENT | ABSENT | DONE |
| FOURTH CASE | PRESENT | ABSENT | PRESENT | PRESENT | DONE |
| FIFTH CASE | ABSENT | PRESENT | PRESENT | PRESENT | NOT DONE |
| SIXTH CASE | ABSENT | PRESENT | PRESENT or ABSENT | ABSENT | DONE |
| SEVENTH CASE | PRESENT | PRESENT | ABSENT | PRESENT | NOT DONE |
| EIGHTH CASE | PRESENT | PRESENT | PRESENT or ABSENT | ABSENT | DONE |

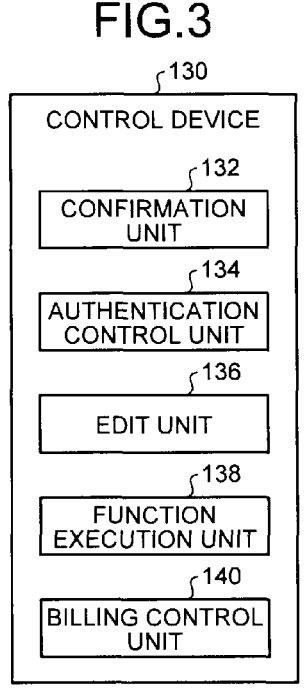

FIG.3

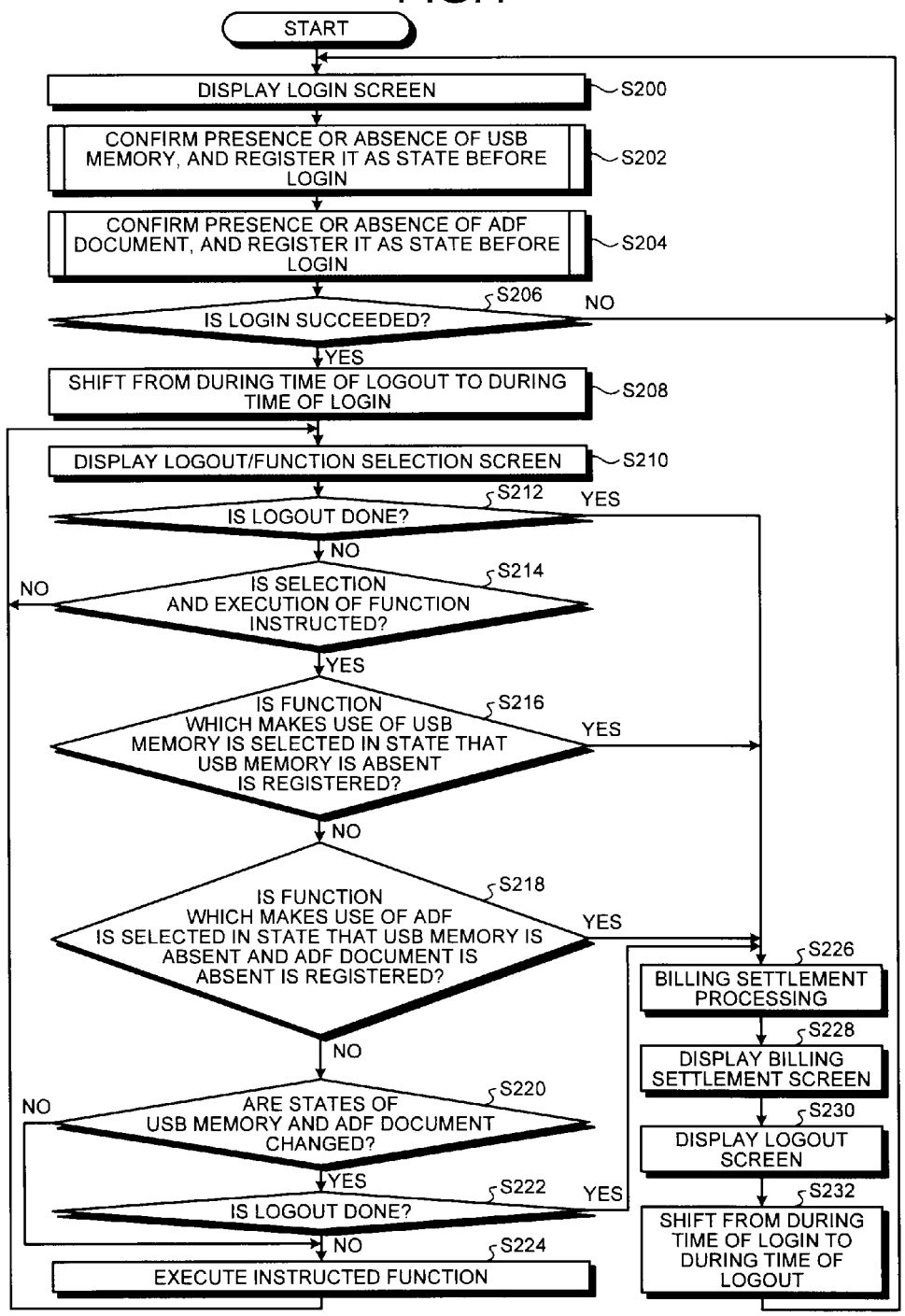

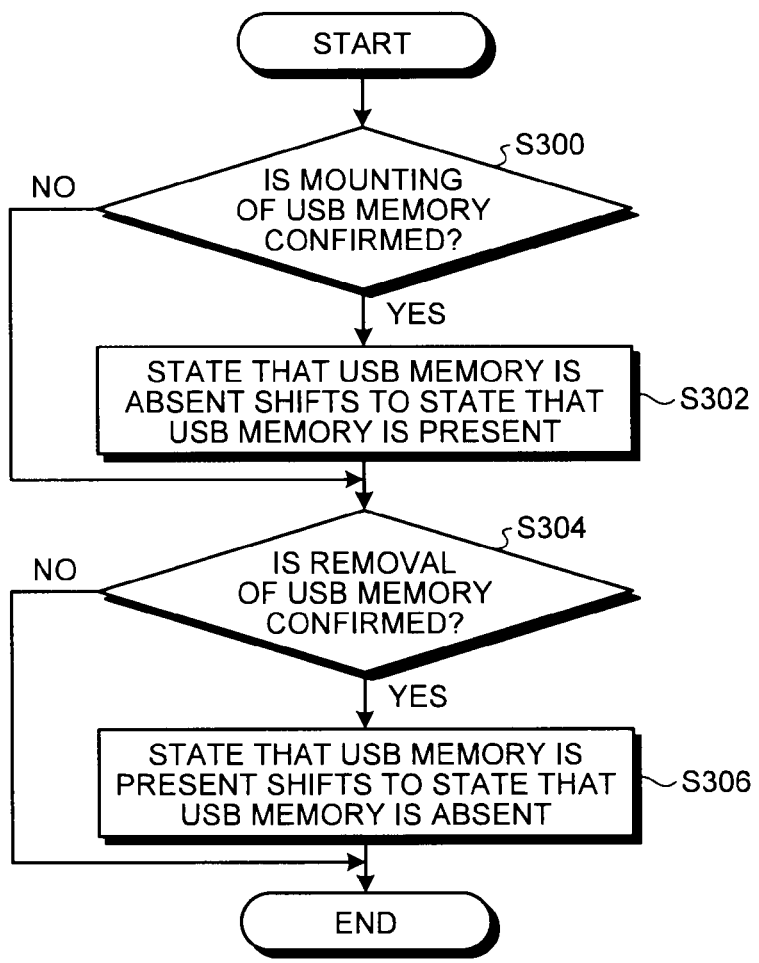

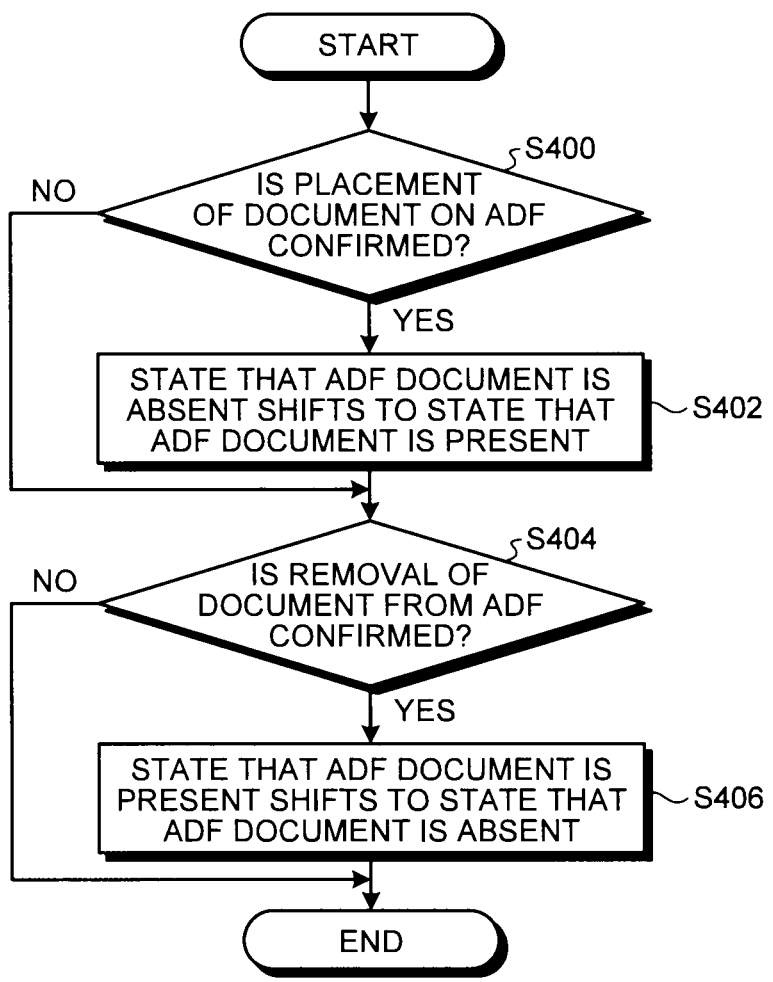

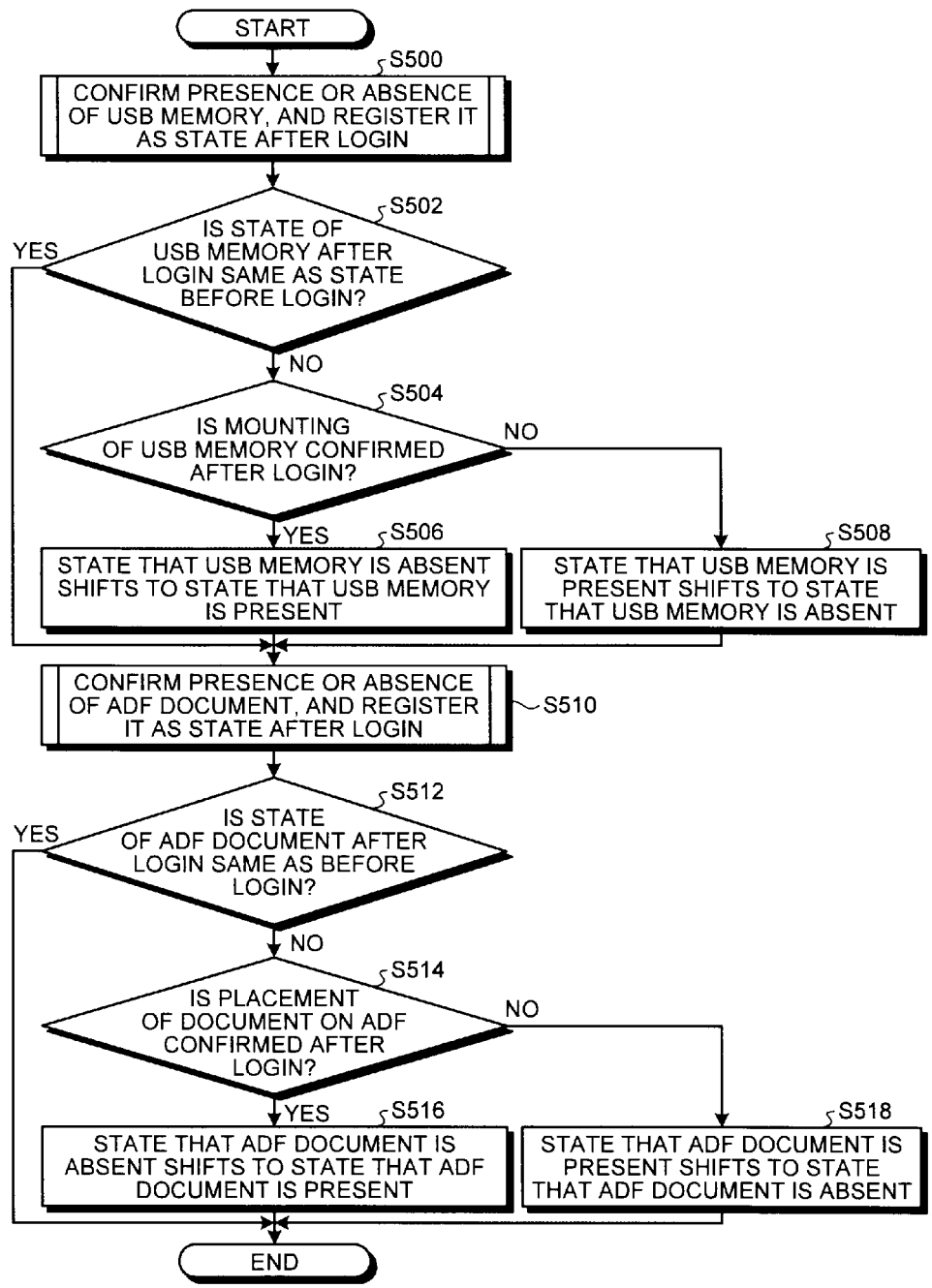

IMAGE FORMING APPARATUS, IMAGE FORMING METHOD, AND AUTHENTICATION PROGRAM PRODUCT

CROSS-REFERENCE TO RELATED APPLICATIONS

The present application claims priority to and incorporates by reference the entire contents of Japanese Patent Application No. 2011-034679 filed in Japan on Feb. 21, 2011.

BACKGROUND OF THE INVENTION

1. Field of the Invention

The invention relates to an image forming apparatus, an image forming method, and an authentication program product.

2. Description of the Related Art

Conventionally, in an image forming apparatus such as a multifunction peripheral and the like, there is known a technology for executing a function such as copy, scan, fax, or print after login, for a purpose of security or a billing count. Further, there is also known a technology for executing a function such as scan, fax, or print making use of a detachable recording medium such as a USB (Universal Serial Bus) memory, a memory card and the like.

Incidentally, in technologies described above, since a login is kept even after a user has executed a function of the image forming apparatus, it is necessary for the user to execute a logout by himself or herself. When the user forgets to execute the logout, there is a problem that the image forming apparatus may be used under the name of the user by a third party.

Here, for example, Japanese Patent No. 4557047 discloses a technology for appropriately releasing a USB device attached to a USB connector at the logout mode.

However, in the conventional technologies described above, since it is necessary for a user to switch an status from an authenticated status to a non-authenticated status by himself or herself after all, there is a possibility that the image forming apparatus may be used under the name of the user by a third party during a transition period from the authenticated status to the non-authenticated status.

SUMMARY OF THE INVENTION

It is an object of the present invention to at least partially solve the problems in the conventional technology.

An image forming apparatus includes a document transport unit configured to transport a document placed thereon, a confirmation unit configured to confirm whether a detachable recording medium is connected to the apparatus and whether the document is placed on the document transport unit, an authentication control unit configured to control an authentication and, when the authentication is succeeded, switches an authentication status from a non-authenticated mode to an authenticated mode, and a function execution unit configured to execute a function, while the authentication status is the authenticated mode. The authentication control unit controls a switching of the authentication status from the authenticated mode to the non-authenticated mode, on the basis of a status indicating whether the recording medium is connected and a status indicating whether the document is placed during the non-authenticated mode, as well as a status indicating whether the recording medium is connected and a status indicating whether the document is placed during the authenticated mode.

An image forming method implemented by an image forming apparatus provided with a document transport unit, a confirmation unit, an authentication control unit, and a function execution unit includes confirming whether a detachable recording medium is connected to the apparatus and whether a document is placed on the document transport unit that transports the document placed thereon, controlling an authentication and, when the authentication is succeeded, switching an authentication status from a non-authenticated mode to an authenticated mode, and executing a function, while the authentication status is the authenticated mode. The controlling includes switching the authentication status from the authenticated mode to the non-authenticated mode, on the basis of a status indicating whether the recording medium is connected during the non-authenticated mode and a status indicating whether the document is placed during the non-authenticated mode, as well as a status indicating whether the recording medium is connected during the authenticated mode and a status indicating whether the document is placed during the authenticated mode.

A computer program product comprising a non-transitory computer-readable medium having computer-readable program codes embedded therein, the program codes when executed causing a computer to execute confirming whether a detachable recording medium is connected to an image forming apparatus and whether a document is placed on a document transport unit that transports the document placed thereon, controlling an authentication and, when the authentication is succeeded, switching an authentication status from a non-authenticated mode to an authenticated mode, and executing a function, while the authentication status is the authenticated mode. The controlling includes switching the authentication status from the authenticated mode to the non-authenticated mode, on the basis of a status indicating whether the recording medium is connected during the non-authenticated mode and a status indicating whether the document is placed during the non-authenticated mode, as well as a status indicating whether the recording medium is connected during the authenticated mode and a status indicating whether the document is placed during the authenticated mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a view illustrating an example of a table according to the embodiment;

FIG. 3 is a block diagram illustrating an example of a function configuration of a control device according to the embodiment;

FIG. 4 is a flowchart illustrating an example of a flow of a procedure of processings executed by the multifunction peripheral according to the embodiment;

FIG. 5 is a flowchart illustrating an example of a flow of a procedure to detect whether a USB memory exists executed in the multifunction peripheral according to the embodiment;

FIG. 6 is a flowchart illustrating an example of a flow of a procedure to detect whether an ADF document exists executed in the multifunction peripheral according to the embodiment; and FIG. 7 is a flowchart illustrating an example of a flow of a procedure to detect whether a state changes executed in the multifunction peripheral according to the embodiment.

DETAILED DESCRIPTION OF THE PREFERRED EMBODIMENTS

Figure 1:
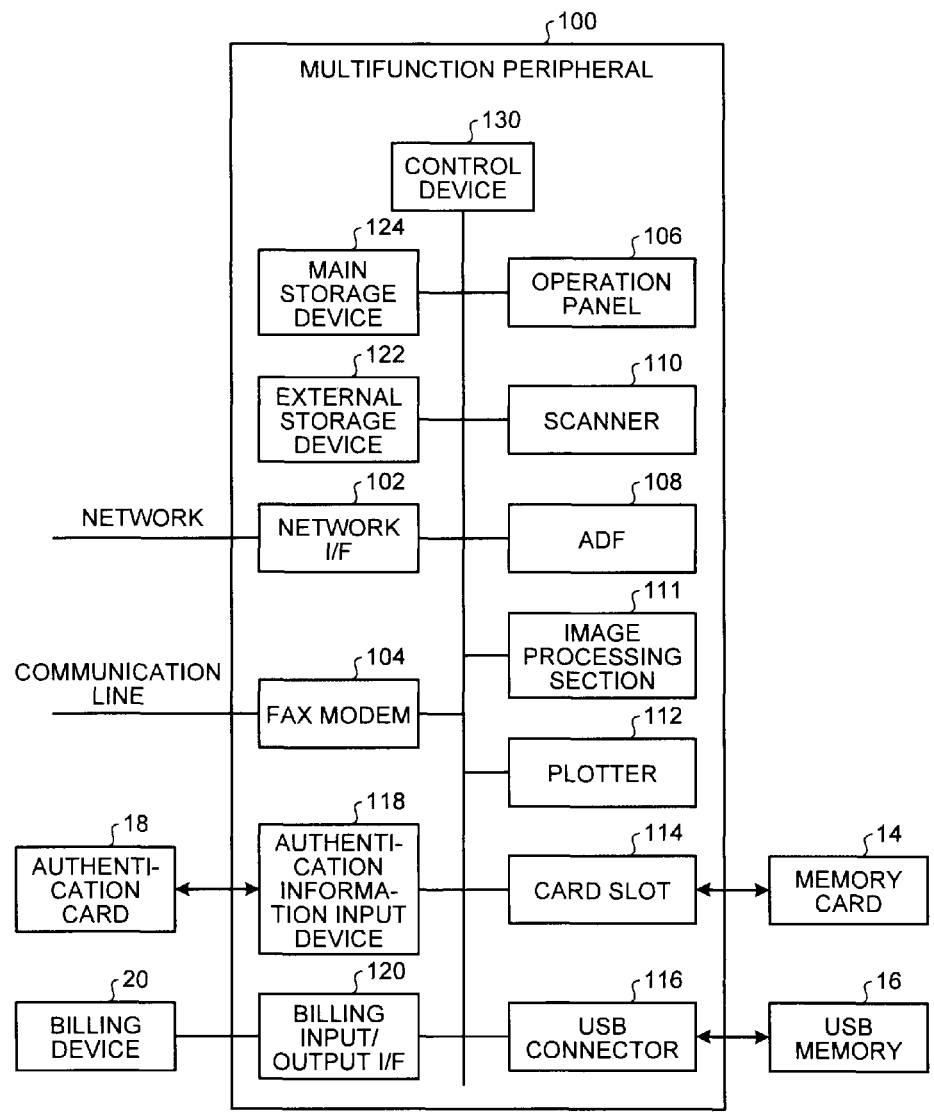
FIG. 1 is a block diagram illustrating an example of a hardware configuration of a multifunction peripheral according to an embodiment.

Embodiments of an image forming apparatus, an authentication program, and a recording medium according to the invention will be explained below in detail referring to the accompanying drawings. Note that, in the respective embodiments described below, as the image forming apparatus, although a multifunction peripheral (MFP) having an ADF (Auto Document Feeder: document conveying device) and an input/output I/F for a detachable recording medium will be explained as an example, the embodiments are not limited thereto. It is sufficient that the image forming apparatus includes the ADF (Auto Document Feeder: document conveying device) and the input/output I/F for the detachable recording medium. Note that the multifunction peripheral has at least two functions of a copy function, a print function, a scan function, and a fax function.

First, a configuration of the multifunction peripheral of an embodiment will be explained.

FIG. 1 is a block diagram illustrating an example of a hardware configuration of a multifunction peripheral 100 according to the embodiment. As illustrated in FIG. 1, the multifunction peripheral 100 includes a network I/F 102, a FAX modem 104, an operation panel 106, an ADF 108, a scanner 110, a image processing section 111, a plotter 112, a card slot 114, a USB connector 116, an authentication information input device 118, a billing input/output I/F 120, an external storage device 122, a main storage device 124, and a control device 130.

The network I/F 102 communicates with a not illustrated external device via a network. The FAX modem 104, which is used for the transmission/reception of FAX, modulates digital image data to an audio signal and transmits the audio signal to a not illustrated external device via a communication line, and demodulates an audio signal received from the not illustrated external device via the communication line to digital image data. The operation panel 106, which is for displaying various screens and for inputting various operations, can be realized by a touch panel display and the like.

The ADF 108 transports a document placed thereon. Specifically, the ADF 108 transports (feeds) a document placed on a placing unit (illustration is omitted) to the scanner 110 and discharges the document to the outside. Further, the ADF 108 detects whether a document exists thereon. Specifically, the ADF 108 detects whether or not the document is placed on the placing unit by, for example, a photo sensor and the like. Note that the sensor for detecting whether or not the document is placed is not limited to the photo sensor and may be any sensor, for example, a mechanical sensor and the like. The ADF 108 may be a single-sided ADF or may be a both-sided ADF.

The scanner 110 is a device for scanning the document transported by the ADF 108 and creating image data. The scanner 110 may be any scanner, for example, a flat bed scanner, a sheet scanner and the like as long as it can create image data from a document. The image processing section 111 is a device for subjecting the image data created by the scanner 110 to an input image processing and subjecting image data output by the plotter 112 to an output image processing and is realized by, for example, an ASIC (Application Specific Integrated Circuit) and the like. The plotter 112 prints and outputs the image data subjected to the image processing by the image processing section 111.

The card slot 114 is an input/output I/F for a memory card 14 and is connected with the memory card 14. The card slot 114 detects whether an electrical connection with the memory card 14 exists, and thereby detects whether the memory card 14 is connected thereto or whether the memory card 14 is attached thereto. The USB connector 116 is an input/output I/F for a USB memory 16 and is connected with the USB memory 16. The USB connector 116 detects whether an electrical connection with the USB memory 16 exists, and thereby detects whether the USB memory 16 is connected thereto or whether the USB memory 16 is attached thereto.

That is, in the embodiment, the memory card 14 and the USB memory 16 are detachable recording mediums and the card slot 114 and the USB connector 116 are input/output I/Fs for the detachable recording mediums. However, the detachable recording mediums and the detachable input/output I/Fs for the detachable recording mediums are not limited thereto and may be, for example, IC cards and IC card readers, and the like.

The authentication information input device 118 is a device for inputting the authentication information of a user of the multifunction peripheral 100 and can be realized by, for example, a card reader and the like for obtaining and inputting the authentication information from, for example, an authentication card 18. It is sufficient that the authentication card 18 is a medium capable of storing the authentication information such as an IC card, a credit card, or a prepaid card, and the like and may be also a mobile terminal such as a mobile phone. Note that the authentication information input device 118 may be a biometric input device for obtaining and inputting a human body feature as the authentication information and may be an existing input device such as a key switch for inputting a password and the like as the authentication information, and the operation panel 106 may have a role of the authentication information input device 118.

The billing input/output I/F 120 is an input/output I/F for a billing device 20 and is connected with the billing device 20. The billing device 20 is a device for settling up a billing amount charged for an authenticated user of the multifunction peripheral 100 in response to a function executed during the authenticated status, and can be realized by, for example, a coin rack, a credit settlement machine, or a prepaid settlement machine, and the like.

The external storage device 122 stores the various program executed by the multifunction peripheral 100 and the data used for the various processings executed by the multifunction peripheral 100 and the like. The external storage device 122 stores a main body control program for realizing various functions such as, for example, a copy function, a print function, a scan function, and a fax function, a user authentication function, and a billing function by the multifunction peripheral 100 as the various programs executed by the multifunction peripheral 100. Further, the external storage device 122 stores, as data to be used for various processing executed in the multifunction peripheral 100, a table which defines whether the status is kept to be "login mode" or changed to be "logout mode" for various combinations of a condition in a "login mode (an example of authenticated status)" and a condition in a "logout mode (an example of non-authenticated status)", as illustrated FIG. 2 for example. Note that the detail of the table illustrated in FIG. 2 will be described later.

The external storage device 122 can be realized by at least any one of non-volatile storage devices capable of magnetically, optically or electrically storing data, for example, a HDD (Hard Disk Drive), a SSD (Solid State Drive), a memory card, a USB memory, an optical disc, a flash ROM (flash memory), and the like.

The main storage device 124 is used as a work area of the control device 130 and the like and can be realized by a volatile storage device (memory), for example, a RAM (Random Access Memory) and the like.

The control device 130 realizes the respective functions of the multifunction peripheral 100 by controlling the various units of the multifunction peripheral 100 by loading the various programs stored in the external storage device 122 to the main storage device 124 and executing the program with using the main storage device 124 as the work area. For example, the control device 130 loads the main body control program stored in the external storage device 122 to the main storage device 124 and executes the main body control program with using the main storage device 124 as the work area. Thereby, the control device 130 controls the ADF 108, the scanner 110, the image processing section 111, the plotter 112, the memory card 14 via the card slot 114, and the USB memory 16 via the USB connector 116. Thus, the control device 130 realizes the copy function, the print function, the scan function, and the fax function. Further, the control device 130 executes a communication control via the network I/F 102, an input/display control of the operation panel 106, an authentication control of the authentication card 18 via the authentication information input device 118, and a billing control of the billing device 20 via the billing input/output I/F 120. The control device 130 can be realized by, for example, a CPU (Central Processing Unit) or the like.

FIG. 3 is a block diagram illustrating an example of a function configuration of the control device 130 of the embodiment. As illustrated in FIG. 3, the control device 130 includes a confirmation unit 132, an authentication control unit 134, an edit unit 136, a function execution unit 138, and a billing control unit 140.

The confirmation unit 132 confirms whether the memory card 14 or the USB memory 16 is connected. Specifically, the confirmation unit 132 confirms whether or not the memory card 14 is attached to the card slot 114 by confirming a detection result of the card slot 114 and confirms likewise whether or not the USB memory 16 is attached to the USB connector 116 by confirming a detection result of the USB connector 116.

Further, the confirmation unit 132 confirms whether a document is placed on the ADF 108. Specifically, the confirmation unit 132 confirms whether or not the document is placed on the placing unit of the ADF 108 by confirming a detection result of the ADF 108.

The authentication control unit 134 controls an authentication and, when the authentication is succeeded, the authentication control unit 134 changes the authentication status from the logout mode to the login mode. Specifically, the authentication control unit 134 executes a user authentication by checking the authentication information input from the authentication information input device 118 with reference to the table stored in the external storage device 122. Note that the authentication control unit 134 may execute the user authentication in association with an external server storing authentication reference information necessary to the user authentication. Then, when the authentication is succeeded, the authentication control unit 134 changes the authentication status from the logout mode to the login mode. Thereby, the respective functions such as the copy function, the print function, the scan function and the fax function can be executed in the multifunction peripheral 100.

Further, the authentication control unit 134 controls the transition of the authentication status from the login mode to the logout mode, on the basis of whether the connection of the USB memory 16 exists during the logout mode, whether the document is placed on the ADF 108 during the logout mode, whether the connection of the USB memory 16 exists during the login mode, and whether the document is placed on the ADF 108 during the login mode. Here, although explanation is made using the USB memory 16 as an example, it may be the memory card 14 or both the USB memory 16 and the memory card 14. For example, if the presence or absence of the connection of the USB memory 16 and the presence or absence of the placement of the document on the ADF 108 during the login mode are changed from the conditions during the logout mode, the authentication control unit 134 controls the authentication status according to the table described above and illustrated in FIG. 2 for example. Here, the table illustrated in FIG. 2 will be explained. In the example illustrated in FIG. 2, the table defines whether the status should be changed to the logout mode for various combinations among a status indicating the presence or absence of the placement of the document on the ADF 108 (hereinafter, referred to "presence or absence of the ADF document") before login (during the logout mode), and a status indicating the presence or absence of the connection of the USB memory 16 (hereinafter, referred to "presence or absence of the USB memory") before login (during the logout mode), a status indicating the presence or absence of the ADF document after login (during the login mode), and a status indicating the presence or absence of the USB memory after login (during the login mode). Also here, an explanation is made on the USB memory 16 as an example, it may be the memory card 14 or may be both the USB memory 16 and the memory card 14.

For example, it is assumed that the confirmation unit 132 confirms that the USB memory 16 is present during the logout mode and the USB memory 16 is absent during the login mode, or that the USB memory 16 is absent during the logout mode and the USB memory 16 is present during the login mode. In this case, according to the table illustrated in FIG. 2, the case falls under the category of second, fourth, sixth, and eighth cases. Thereby, the authentication control unit 134 switches the authentication status from the login mode to the logout mode, and thus the logout is executed.

For example, if the USB memory 16 is present during the logout mode and the USB memory 16 is absent during the login mode, it is considered that a user removed the USB memory 16 after conducting a function using the USB memory 16. In this case, the logout is executed. Alternatively, if the USB memory 16 is absent during the logout mode and the USB memory 16 is present during the login mode, it is considered that a user forgets to log out after conducting a function using no USB memory 16 and the third party is going to use a function using the USB memory 16 under the name of the former user. In this case, the logout is executed. Therefore, an erroneous operation, an erroneous billing, and an illegal use can be prevented.

Further, for example, it is assumed that the confirmation unit 132 confirms that the USB memory 16 is absent and the ADF document is absent during the logout mode, and the USB memory 16 is absent and the ADF document is present during the login mode, or confirms that the USB memory 16 is absent and the ADF document is present during the logout mode, and the USB memory 16 is absent and the ADF document is absent during the login mode. In this case, according to the table illustrated in FIG. 2, the case falls under the category of a first case and a third cases. Thereby, the authentication control unit 134 switches the authentication status from the login mode to the logout mode, and thus the logout is executed.

For example, if the USB memory 16 is absent and the ADF document is absent during the logout mode, and the USB memory 16 is absent and the ADF document is present during the login mode, it is considered that a user forgets to log out after conducting a function using no ADF document and the third party is going to use a function using the ADF document under the name of the former user. In this case, the logout is executed. Alternatively, if the USB memory 16 is absent and the ADF document is present during the logout mode, and the USB memory 16 is absent and the ADF document is absent during the login mode, it is considered that the user finished a function using the ADF document. In this case, the logout is executed. Therefore, the erroneous operation, the erroneous billing, and the illegal use can be prevented.

However, if the function execution unit 138 continues to execute a function, when the confirmation unit 132 confirms that the USB memory 16 is absent and the ADF document is present during the logout mode, and the USB memory 16 is absent and the ADF document is absent during the login mode, which falls in the third case. In this case, the authentication control unit 134 switches the authentication status from the login mode to the logout mode and thus the logout is executed, after the function is completed by the function execution unit 138. This is because it is inconvenience if the logout is executed while a function is under the execution. This arrangement makes it possible to prevent the erroneous operation, the erroneous billing and the illegal use, and further to improve the convenience.

Further, for example, if the confirmation unit 132 confirms that the USB memory 16 is present and the ADF document is absent during the logout mode, and the USB memory 16 is present and the ADF document is present during the login mode, or confirms that the USB memory 16 is present and the ADF document is present during the logout mode, and the USB memory 16 is present and the ADF document is absent during the login mode. In this case, according to the table illustrated in FIG. 2, the case falls under the category of a fifth and seventh cases. Thereby, the authentication control unit 134 maintains the authentication status at the login mode, and thus the logout is not executed. Incidentally, the fifth case and the seventh case include not only a case that a document is placed on the ADF during the login mode, but also a case that the placed document disappears due to the execution of a function or a case that the placed document is removed by the user.

For example, if the USB memory 16 is present during the logout mode and the USB memory 16 is present during the login mode, it is considered that it is likely that the user executes a function using the USB memory 16. In this case, the logout is not executed. Namely, the logout is not executed in order to improve the convenience, since the same user is likely to continue the operation.

Incidentally, in the present embodiment, the explanation has been made on an example that the authentication control unit 134 controls the authentication status according to the table shown by FIG. 2. However, the embodiment is not limited thereto. The authentication status may be controlled by defining the contents of the table shown by FIG. 2, and by executing the main body control program in which various processing is branched according to the definition.

The edit unit 136 edits the table stored in the external storage device 122. Specifically, the edit unit 136 receives an edit input such as change, addition, and deletion from the operation panel 106 and edits the table stored in the external storage device 122 according to the received edit input.

For example, the first-the eighth cases in the table illustrated in FIG. 2 are set under a premise that a user is not likely to forget removing the USB memory 16 even if he or she forgets to logout, or that a user who does not make use of the USB memory 16 is likely to operate only one function (job) during one login session. Without limiting to these cases, the edit unit 136 can set whether the logout should be executed for every case in accordance with an intended purpose.

The function execution unit 138 executes a function, if the authentication status is in the login mode. Specifically, if the authentication status is in the login mode, the function execution unit 138 receives from the operation panel 106 an instruction to execute a function among various functions including the copy function, the print function, the scan function and the fax function, and executes the instructed function.

For example, if the copy function is instructed, the function execution unit 138 causes the ADF 108 to transport a document, causes the scanner 110 to create image data, causes the image processing section 111 to execute an input image processing and an output image processing, and causes the plotter 112 to make a print and to output the print.

Further, for example, if the print function is instructed, the function execution unit 138 causes the network I/F 102 to obtain print data from the external device, causes the card slot 114 to obtain print data from the memory card 14, and causes the USB connector 116 to obtain print data from the USB memory 16. Then, the function execution unit 138 causes the image processing section 111 to execute the output image processing on the print data and causes the plotter 112 to output a print.

Further, for example, if the scan function is instructed, the function execution unit 138 causes the ADF 108 to transport a document, causes the scanner 110 to create image data, causes the image processing section 111 to execute the input image processing, causes the external storage device 122 to store the image data, causes the memory card 14 to store the image data via the card slot 114, and causes the USB memory 16 to store the image data via the USB connector 116.

Further, for example, if the fax transmission function is instructed, the function execution unit 138 causes the ADF 108 to transport a document, causes the scanner 110 to create image data, causes the image processing section 111 to execute the input image processing, and causes the FAX modem 104 to transmit the image data to the external device. Further, for example, the function execution unit 138 causes the card slot 114 to obtain fax data from the memory card 14, causes the USB connector 116 to obtain the fax data from the USB memory 16, and causes the FAX modem 104 to transmit the fax data to the external device.

Further, for example, if the fax reception function is instructed, the function execution unit 138 causes the FAX modem 104 to receive fax data from the external device, causes the image processing section 111 to execute an output image processing, and causes the plotter 112 to make a print and to output the print. Further, for example, the function execution unit 138 causes the FAX modem 104 to receive the fax data from the external device, causes the memory card 14 to store the fax data via the card slot 114, and causes the USB memory 16 to store the fax data via the USB connector 116.

Incidentally, in the present embodiment, the authentication status is likely to be changed to the logout mode, if the memory card 14 or the USB memory 16 is attached or inserted, or a document is placed on the ADF 108, during the login mode. In order to execute respective function such as copy function, print function, scan function and fax function, it is required to attach or insert the memory card 14 or the USB memory 16, or to place a document on the ADF 108, while the authentication status is in the logout mode, i.e. before login.

When the authentication status is changed from the login mode to the logout mode, the billing control unit 140 controls a settlement of a billing amount, charged to the authenticated user by the billing device 20, depending on the function executed by the function execution unit 138 during the login mode.

Next, an operation of the multifunction peripheral of the embodiment will be explained. Note that, in the operation of the multifunction peripheral, although explanation is made on the USB memory 16 as an example of the detachable recording medium, it may be the memory card 14 or may be both the USB memory 16 and the memory card 14.

FIG. 4 is a flowchart illustrating an example of a flow of a procedure of processings executed by the multifunction peripheral 100 of the embodiment.

First, the authentication control unit 134 causes the operation panel 106 to display a login screen (use start screen) (step S200).

Subsequently, the confirmation unit 132 confirms the presence or absence of the USB memory 16, that is, whether or not the USB memory 16 is mounted on the USB connector 116 and registers a confirmation result to the main storage device 124 as the status of the USB memory before login (during the logout mode) (step S202). Note that the detail of the confirmation of the presence or absence of USB memory at step S202 will be described later.

Subsequently the confirmation unit 132 confirms the presence or absence of the ADF document, that is, whether or not the document is placed on the placing unit of the ADF 108 and registers a confirmation result to the main storage device 124 as the status of the ADF document before login (during the logout mode) (step S204). Note that the detail of the confirmation of the presence or absence of the ADF document at step S204 will be described later.

Subsequently, the authentication control unit 134 executes an authentication using the authentication information obtained from the authentication card 18 via the authentication information input device 118, and, when the authentication is succeeded, that is, a login is succeeded (Yes at step S206), the authentication control unit 134 changes the authentication status from the logout mode to the login mode (step S208). In contrast, when the authentication fails, that is, when the login fails, (No at step S206), the process returns to step S200.

When the login is succeeded, subsequently, the authentication control unit 134 causes the operation panel 106 to display a logout/function selection screen (step S210).

Subsequently, the authentication control unit 134 confirms whether or not a logout instruction is input from the operation panel 106, that is, whether the logout should be done (step S212).

When the logout should not be done (No at step S212), subsequently, the function execution unit 138 selects a function from the operation panel 106 and confirms whether or not an instruction to execute the selected function is input (step S214). Note that, when an instruction to execute the selected function is not input (No at step S214), the process returns to step S210.

When an instruction to execute the selected function is input (Yes at step S214), subsequently, the authentication control unit 134 refers to the USB memory status registered to the main storage device 124 at step S202 and confirms whether a function using the USB memory 16 is selected or not in the registered status in which the USB memory is absent (step S216).

It is assumed that the function using the USB memory 16 is not selected in the registered status in which the USB memory is absent (No at step S216). In this case, subsequently, the authentication control unit 134 refers to the USB memory status registered to the main storage device 124 at step S202 and to the ADF document status registered to the main storage device 124 at step S204, and confirms whether a function using the ADF 108 is selected or not in the registered status in which the USB memory is absent and the ADF document is absent (step S218).

It is assumed that the function using the ADF 108 is not selected in the registered status in which the USB memory is absent and the ADF document is absent (No at step S218). In this case, the confirmation unit 132 confirms whether the status after login (during the login mode) is changed from the status before login (during the logout mode). Specifically, it is confirmed whether the status of the USB memory and the ADF document after login is changed from the status of the USB memory and the ADF document before login (Step S220). Note that the detail of step S220 will be described later. Note that the execution timing of the processing at step S220 is not limited to the above-mentioned timing. For example, it may be executed at timing while the function execution unit 138 continues to execute a function.

If the status of the USB memory and the ADF document after login is changed from the status of the USB memory and the ADF document before login (Yes at step S220), the authentication control unit 134 controls whether or not the logout should be done according to the table illustrated in FIG. 2 (step S222).

If the logout should not be done (No at step S222) or if the status of the USB memory and the ADF document after login is not changed from the status of the USB memory and the ADF document before login (No at step S220), the function execution unit 138 executes the instructed function (step S224). Thereafter, the process returns to step S210.

In contrast, if the logout should be done, (Yes at step S212, Yes at step S222), if the function using the USB memory 16 is selected in the registered status in which the USB memory is absent (Yes at step S216), or if the function using the ADF 108 is selected in the registered status in which the USB memory is absent and the ADF document is absent (Yes at step S218), the process goes to step S226.

Subsequently, the billing control unit 140 executes a billing settlement processing for controlling the settlement of the billing amount, charged to the authenticated user by the billing device 20, depending on the function executed by the function execution unit 138 during the login mode (step S226).

Subsequently, the billing control unit 140 causes the operation panel 106 to display a billing settlement screen and displays the billing settlement processing (step S228).

Subsequently, the authentication control unit 134 causes the operation panel 106 to display a logout screen (use finish screen) (step S230).

Subsequently, the authentication control unit 134 changes the authentication status from the login mode to the logout mode (step S232). Thereafter, the process returns to step S200.

FIG. 5 is a flowchart illustrating an example of a flow of a procedure of a confirmation processing (step S202 of FIG. 4) of presence or absence of the USB memory executed in the multifunction peripheral 100 of the embodiment.

First, the confirmation unit 132 refers to a detection result of the USB connector 116 and confirms whether or not the USB memory 16 is mounted on the USB connector 116 (step S300). Then, if the confirmation unit 132 confirms that the USB memory 16 is mounted (Yes at step S300), the confirmation unit 132 switches the status indicating that the USB memory is absent to the status indicating that the USB memory is present (step S302), whereas if the confirmation unit 132 does not confirm that the USB memory 16 is mounted (No at step S300), the confirmation unit 132 maintains a present status.

Subsequently, the confirmation unit 132 refers to a detection result of the USB connector 116 and confirms whether or not the USB memory 16 is removed from the USB connector 116 (step S304). Then, if the confirmation unit 132 confirms that the USB memory 16 is removed (Yes at step S304), the confirmation unit 132 switches the status indicating that the USB memory is present to the status indicating that the USB memory is absent (step S306), whereas if the confirmation unit 132 does not confirm that the USB memory 16 is removed (No at step S304), the confirmation unit 132 maintains a present status.

FIG. 6 is a flowchart illustrating an example of a flow of a procedure of a confirmation processing (step S204 of FIG. 4) of presence or absence of the ADF document executed in the multifunction peripheral 100 of the embodiment.

First, the confirmation unit 132 refers to a detection result of the ADF 108 and confirms whether or not a document is placed on the ADF 108 (step S400). Then, if the confirmation unit 132 confirms that the document is mounted on the ADF 108 (Yes at step S400), the confirmation unit 132 switches the status indicating that the ADF document is absent to the status indicating that the ADF document is present (step S402), whereas if the confirmation unit 132 does not confirm that the document is mounted on the ADF 108 (No at step S400), the confirmation unit 132 maintains a present status.

Subsequently, the confirmation unit 132 refers to a detection result of the ADF 108 and confirms that a document is removed from the ADF 108 (step S404). Then, if the confirmation unit 132 confirms that the document is removed from the ADF 108 (Yes at step S404), the confirmation unit 132 switches the status indicating that the ADF document is present to the status indicating that the ADF document is absent (step S406), whereas if the confirmation unit 132 does not confirm that the document is removed from the ADF 108 (No at step S404), the confirmation unit 132 maintains a present status.

FIG. 7 is a flowchart illustrating an example of a flow of a procedure of a confirmation processing (step S220 of FIG. 4) of a status change executed in the multifunction peripheral 100 of the embodiment.

First, the confirmation unit 132 confirms the presence or absence of the USB memory 16, that is, whether or not the USB memory 16 is mounted on the USB connector 116 and registers a confirmation result to the main storage device 124 as the USB memory status after login (during the login mode) (step S500). Note that the detail of the confirmation of the presence or absence of the USB memory at step S500 is the same as the flowchart of FIG. 5.

Subsequently, the confirmation unit 132 confirms whether or not the USB memory status before login which is registered to the main storage device 124 at step S202 of FIG. 4 is the same as the USB memory status after login which is registered to the main storage device 124 at step S500 (step S502).

If the USB memory status is different between before login and after login (No at step S502), the confirmation unit 132 confirms whether or not the USB memory 16 is mounted after login, that is, whether the USB memory status after login indicates the presence or absence of the USB memory (step S504).

If the USB memory status after login indicates the presence of the USB memory (Yes at step S504), the confirmation unit 132 switches the USB memory status which indicates the absence of the USB memory to the USB memory status which indicates the presence of the USB memory (step S506), whereas if the USB memory status after login indicates the absence of the USB memory (No at step S504), the confirmation unit 132 switches the USB memory status which indicates the presence of the USB memory to the USB memory status which indicates the absence of the USB memory (step S508).

Note that if the USB memory status is the same between before login and after login (Yes at step S502), the confirmation unit 132 keeps a present status.

Subsequently, the confirmation unit 132 confirms the presence or absence of the ADF document, that is, whether or not a document is placed on the placing unit of the ADF 108 and registers a confirmation result to the main storage device 124 as the ADF document status after login (during the login mode) (step S510). Note that the detail of the confirmation of the presence or absence of the ADF document at step S510 is the same as the flowchart of FIG. 6.

Subsequently, the confirmation unit 132 confirms whether or not the ADF document status before login which is registered to the main storage device 124 at step S204 of FIG. 4 is the same as the ADF document status after login which is registered to the main storage device 124 at step S510 (step S512).

If the ADF document status is different between before login and after login (No at step S512), the confirmation unit 132 confirms whether or not a document is placed on the ADF after login, that is, whether the ADF document status after login indicates the presence or absence of the ADF document (step S514).

If the ADF document status after login indicates the presence of the ADF document (Yes at step S514), the confirmation unit 132 switches the ADF document status which indicates the absence of the ADF document to the ADF document status which indicates the presence of the ADF document (step S516), whereas if the ADF document status after login indicates the absence of the ADF document (No at step S514), the confirmation unit 132 switches the ADF document status which indicates the presence of the ADF document to the ADF document status which indicates the absence of the ADF document (step S518).

Note that if the ADF document status is the same between before login and after login (Yes at step S512), the confirmation unit 132 keeps a present status.

As described above, according to the present embodiment, it is controlled whether the authentication status is maintained at the login mode, or switched to the logout mode, depending on the status change of the USB memory or the ADF document after login. Thus, it is possible to reduce an unintentional use of the image forming apparatus.

Specifically, according to the present embodiment, it is possible to prevent an unfair use or an erroneous operation of the image forming apparatus, and an erroneous billing to a user, even if the user forgets the "logout", since the authentication status is switched to the logout mode, depending on the status change of the USB memory or the ADF document after login. Furthermore, it is also possible to improve the convenience or operability of the image forming apparatus by maintaining the authentication status at the login mode, depending on the status change of the USB memory or the ADF document after login.

Incidentally, the authentication program to be executed by the multifunction peripheral 100 of the embodiment is provided by being previously assembled to the external storage device 122 or the like.

The authentication program to be executed by the multifunction peripheral 100 of the embodiment may be provided by being recorded on a computer-readable recording medium such as CD-ROM, flexible disc (FD), CD-R, DVD (Digital Versatile Disk) and the like, as an installable or executable file.

Further, the authentication program to be executed by the multifunction peripheral 100 of the embodiment may be provided by being stored on a computer connected to a network such as Internet and by being downloaded via the network. Further, the authentication program to be executed by the multifunction peripheral 100 of the embodiment may be provided or distributed via the network such as Internet.

The authentication program to be executed by the multifunction peripheral 100 of the embodiment is configured as a module for realizing the respective units described above on a computer. As actual hardware, the respective units are realized on a computer by that the control device 130 reads the authentication program on the main storage device 124 from the external storage device 122 and executes the authentication program.

MODIFICATION

Note that the invention is not limited to the above-mentioned embodiments and can be variously modified.

According to the invention, it is possible to advantageously reduce an unintentional use of the image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
a document transport unit configured to transport a document placed thereon;
a confirmation unit configured to confirm whether a detachable recording medium is connected to the apparatus and whether the document is placed on the document transport unit;
an authentication control unit configured to control an authentication and, when the authentication is succeeded, switches an authentication status from a non-authenticated mode to an authenticated mode; and
a function execution unit configured to execute a function, while the authentication status is the authenticated mode,
wherein, during the authenticated mode, the authentication control unit is configured to control a switching of the authentication status from the authenticated mode to the non-authenticated mode based on i) a status indicating each of whether the recording medium is connected and a status indicating whether the document is placed on the document transport unit during the non-authenticated mode, and ii) a status indicating each of whether the recording medium is connected and a status indicating whether the document is placed on the document transport unit during the authenticated mode.

2. The image forming apparatus according to claim 1, wherein
the authentication control unit switches the authentication status from the authenticated mode to the non-authenticated mode,
if the confirmation unit confirms that the recording medium is connected during the non-authenticated mode and the recording medium is not connected during the authenticated mode, or
if the confirmation unit confirms that the recording medium is not connected during the non-authenticated mode and the recording medium is connected during the authenticated mode.

3. The image forming apparatus according to claim 1, wherein
the authentication control unit switches the authentication status from the authenticated mode to the non-authenticated mode,
if the confirmation unit confirms that the recording medium is not connected and the document is not placed during the non-authenticated mode, and that the recording medium is not connected and the document is placed during the authenticated mode, or
if the confirmation unit confirms that the recording medium is not connected and the document is placed during the non-authenticated mode, and that the recording medium is not connected and the document is not placed during the authenticated mode.

4. The image forming apparatus according to claim 3, wherein
the authentication control unit switches the authentication status from the authenticated mode to the non-authenticated mode after the function execution unit completes the function,
if the confirmation unit confirms that the recording medium is not connected and the document is placed during the non-authenticated mode, and that the recording medium is not connected and the document is not placed during the authenticated mode, and
if the function execution unit is currently under the execution of the function.

5. The image forming apparatus according to claim 1, wherein
the authentication control unit does not change the authentication status from the authenticated mode,
if the confirmation unit confirms that the recording medium is connected and the document is not placed during the non-authenticated mode, and that the recording medium is connected and the document is placed during the authenticated mode, or
if the confirmation unit confirms that the recording medium is connected and the document is placed during the non-authenticated mode, and that the recording medium is connected and the document is not placed during the authenticated mode.

6. The image forming apparatus according to claim 1, further comprising
a storage unit configured to store a table which defines whether the authentication status is maintained at the authenticated mode or the authentication status is switched from the authenticated mode to the non-authenticated mode, for various combinations among a status indicating whether the recording medium is connected during the non-authenticated mode, a status indicating whether the document is placed during the non-authenticated mode, a status indicating whether the recording medium is connected during the authenticated mode, and a status indicating whether the document is placed during the authenticated mode, wherein the authentication control unit controls the authentication status in accordance with the table, if the status indicating whether the recording medium is connected during the authenticated mode is changed from the status indicating whether the recording medium is connected during the non-authenticated mode, and/or if the status indicating whether the document is placed during the authenticated mode is changed from the status indicating whether the document is placed during the non-authenticated mode.

7. The image forming apparatus according to claim 6, further comprising an edit unit configured to edit the table.

8. The image forming apparatus according to claim 1, further comprising a billing control unit configured to control a settlement of a billing amount charged to an authenticated user depending on the function executed by the function execution unit during the authenticated mode, when the authentication status is switched from the authenticated mode to the non-authenticated mode.

9. An image forming method implemented by an image forming apparatus provided with a document transport unit, a confirmation unit, an authentication control unit, and a function execution unit, the method comprising:

confirming whether a detachable recording medium is connected to the apparatus and whether a document is placed on the document transport unit that transports the document placed thereon;

controlling an authentication and, when the authentication is succeeded, switching an authentication status from a non-authenticated mode to an authenticated mode; and executing a function, while the authentication status is the authenticated mode, wherein, during the authenticated mode, the controlling includes switching the authentication status from the authenticated mode to the non-authenticated mode based on i) a status indicating each of whether the recording medium is connected during the non-authenticated mode and a status indicating whether the document is placed on the document transport unit during the non-authenticated mode, and based on ii) a status indicating each of whether the recording medium is connected during the authenticated mode and a status indicating whether the document is placed on the document transport unit during the authenticated mode.

10. The image forming method according to claim 9, wherein the controlling includes switching the authentication status from the authenticated mode to the non-authenticated mode, if the confirmation unit confirms that the recording medium is connected during the non-authenticated mode and the recording medium is not connected during the authenticated mode, or if the confirmation unit confirms that the recording medium is not connected during the non-authenticated mode and the recording medium is connected during the authenticated mode.

11. The image forming method according to claim 9, wherein the controlling includes switching the authentication status from the authenticated mode to the non-authenticated mode, if the confirmation unit confirms that the recording medium is not connected and the document is not placed during the non-authenticated mode, and that the recording medium is not connected and the document is placed during the authenticated mode, or if the confirmation unit confirms that the recording medium is not connected and the document is placed during the non-authenticated mode, and that the recording medium is not connected and the document is not placed during the authenticated mode.

12. The image forming method according to claim 11, wherein the controlling includes switching the authentication status from the authenticated mode to the non-authenticated mode after the function execution unit completes the function, if the confirmation unit confirms that the recording medium is not connected and the document is placed during the non-authenticated mode, and that the recording medium is not connected and the document is not placed during the authenticated mode, and if the function execution unit is currently under the execution of the function.

13. The image forming method according to claim 9, wherein the controlling includes not changing the authentication status from the authenticated mode, if the confirmation unit confirms that the recording medium is connected and the document is not placed during the non-authenticated mode, and that the recording medium is connected and the document is placed during the authenticated mode, or if the confirmation unit confirms that the recording medium is connected and the document is placed during the non-authenticated mode, and that the recording medium is connected and the document is not placed during the authenticated mode.

14. The image forming method according to claim 9, further comprising storing a table which defines whether the authentication status is maintained at the authenticated mode or the authentication status is switched from the authenticated mode to the non-authenticated mode, for various combinations among a status indicating whether the recording medium is connected during the non-authenticated mode, a status indicating whether the document is placed during the non-authenticated mode, a status indicating whether the recording medium is connected during the authenticated mode, and a status indicating whether the document is placed during the authenticated mode, wherein the controlling includes controlling the authentication status in accordance with the table, if the status indicating whether the recording medium is connected during the authenticated mode is changed from the status indicating whether the recording medium is connected during the non-authenticated mode, and/or if the status indicating whether the document is placed during the authenticated mode is changed from the status indicating whether the document is placed during the non-authenticated mode.

15. The image forming method according to claim 14, further comprising editing the table.

16. The image forming method according to claim 9, further comprising controlling a settlement of a billing amount charged to an authenticated user depending on the function executed by the function execution unit during the authenticated mode, when switching the authentication status from the authenticated mode to the non-authenticated mode.

17. A computer program product comprising a non-transitory computer-readable medium having computer-readable program codes embedded therein, the program codes when executed causing a computer to execute:

confirming whether a detachable recording medium is connected to an image forming apparatus and whether a document is placed on a document transport unit that transports the document placed thereon;

controlling an authentication and, when the authentication is succeeded, switching an authentication status from a non-authenticated mode to an authenticated mode; and executing a function, while the authentication status is the authenticated mode; wherein, during the authenticated mode, the controlling includes switching the authentication status from the authenticated mode to the non-authenticated mode based on i) a status indicating each of whether the recording medium is connected during the non-authenticated mode and a status indicating whether the document is placed on the document transport unit during the non-authenticated mode, and based on ii) a status indicating each of whether the recording medium is connected during the authenticated mode and a status indicating whether the document is placed on the document transport unit during the authenticated mode.

\* \* \* \* \*